United States Patent [19]

Bickler et al.

[11] Patent Number: 4,815,841
[45] Date of Patent: Mar. 28, 1989

[54] HIGH RESOLUTION COLOR BAND PYROMETER RATIOING

[75] Inventors: Donald B. Bickler, Temple City; Paul K. Henry, Altadena; D. Daniel LoGiurato, Covina, all of Calif.

[73] Assignee: California Institute of Technology, Pasadena, Calif.

[21] Appl. No.: 80,980

[22] Filed: Aug. 3, 1987

[51] Int. Cl.$^4$ .............................. G01J 5/08; G01J 5/32
[52] U.S. Cl. ........................................ 356/43; 356/45; 374/131
[58] Field of Search .................... 356/44, 43, 45, 49; 374/130, 131

[56] References Cited

U.S. PATENT DOCUMENTS 4,650,318 3/1987 Pointer et al. .................... 356/43

OTHER PUBLICATIONS

Bristol-Velotron Two-Color (Ratio) Radiation Pyrometer, Bulletin P-1299, Sep. 1965, The Bristol Co. Waterbury, Conn.

*Primary Examiner*—Vincent P. McGraw
*Attorney, Agent, or Firm*—Freilich, Hornbaker, Rosen & Fernandez

[57] ABSTRACT

The sensing head of a two-color band ratioing pyrometer of a known type using a fiber optic cable to couple radiation to dual detector photodiodes is improved to have high spatial resolution by focusing the radiation received through an objective lens (i.e., by focusing the image of a target area) onto an opaque sheet spaced in front of the input end of the fiber optic cable. A two-mil hole in that sheet then passes radiation to the input end of the cable. The detector has two channels, one for each color band, with an electronic-chopper stabilized current amplifier as the input stage followed by an electronic-chopper stabilized voltage amplifier.

5 Claims, 2 Drawing Sheets

HIGH RESOLUTION COLOR BAND PYROMETER RATIOING

ORIGIN OF INVENTION

The invention described herein was made in the performance of work under a NASA contract, and is subject to the provisions of Public Law 96-517 (35 USC 202) in which the Contractor has elected to retain title.

BACKGROUND OF THE INVENTION

This invention relates to optical pyrometers and more particularly to a two-color band ratioing pyrometer having high spatial resolution.

In attempting to measure the temperature of certain critical elements in the hot zone of a silicon crystal-growth furnace with thermocouples, three problems were encountered: measurements were not repeatable to the accuracy required, the thermal distribution was disturbed, and the thermocouples could not be used to measure the temperature of the molten silicon. It therefore became necessary to use an optical pyrometer illustrated in FIG. 1, which avoided those problems and allowed valid temperature measurements, even under conditions that would produce misleading results with a single-color optical pyrometer, such as variation in emissivity for a particular temperature (if the variation is equal in the two color bands), and viewing the target through a furnace window (if the window has equal transmissivity in the two wavelengths).

A two-color pyrometer measures temperature by calculating the ratio of the radiation at two different wavelength (color) bands. By using a ratio, the measurement becomes much less sensitive to absolute radiation falling on the detector than is the case for pyrometers using a single wavelength band. Thus, a two-color pyrometer is desirable in many applications because such instruments are valid over a wide range of sensor illumination.

Referring to FIG. 1, which shows the sensing head for the prior-art pyrometer, an objective lens at the end of a focusing barrel is adjusted so that the focal point of a telescope comprised of the object lens and a field lens with a reticle for sighting the target. The objective lens is an achromatic lens to prevent color distortion.

The radiation from the objective lens passes through the aperture of the housing for the sensing head, and is reflected by a plane mirror that is front coated to reflect the color bands of interest, but allow visible radiation to pass through the mirror to the field lens. An eyepiece is focused on the reticle of the field lens so that it will be visible to the viewer superimposed on the image of the target.

The mirror reflects the incoming radiation in the color bands of interest to a first end of a fiber-optic cable used to guide the radiation to a pair of detector photodiodes, each designed for optimum response to the different one of the two color bands of interest. As noted above, the fiber-optic cable is made up of a bundle of fibers. The result is a cable having a 0.032 inch diameter. The fibers are randomly arranged at the input end relative to the other end and serve to distribute the radiation uniformly over the detector, a factor that contributes to lower detector noise.

A fiber-optic mount holds the face of the input end of the fiber-optic cable perpendicular to the optical axis of the reflected radiation. When the target is focused at the reticle of the field lens, it will also be focused on the input end of the cable. As a consequence, the diameter of the fiber-optic cable determines the sensing field of view and therefore the spatial resolution of the optical pyrometer.

A problem with the prior-art two-color ratioing pyrometer was the inability to spatially resolve small targets and simultaneously maintain the validity of the temperature measurement. If the spatial resolution were restricted to the size of interest (in this case, targets less than 0.030 inch diameter), then the radiation reaching the detectors, and the detector output signal, would be reduced proportionally to the ratio of the squares of the target diameters. When driven by this vastly reduced detector output, detector signal processing electronics lacked the sensitivity to yield valid measurements. This problem was solved by designing and fabricating an entirely new detector signal processing electronics package as described herein.

Another problem was encountered in the optical design of prior-art pyrometers when the spatial resolution was restricted by a simple optical stop at the input end of the optical fiber cable used in prior art to define the spatial resolution. The optical stop restricted the number of optical fibers transmitting radiation to the detector, thus resulting in non-uniform detector illumination and higher detector noise generation. To solve this problem, the prior-art optical design was modified as described herein to assure uniform detector illumination while maintaining the high spatial resolution.

OBJECTS AND SUMMARY OF THE INVENTION

An object of this invention is to increase the spatial resolution of prior-art pyrometers.

A further object of the invention is to increase the sensitivity of prior-art pyrometers so that valid measurements are assured with a field of view substantially reduced for high spatial resolution.

In accordance with the present invention, the optics of the pyrometer are arranged to focus the image of a target onto an opaque sheet in front of the input end of a fiber-optic cable that transmits radiation from the target to dual photodiodes responsive to two color bands used for band ratioing. A two-mil hole is provided in the sheet to pass a small portion of the target field of view to the input end of the cable spaced from the hole a distance sufficient for that portion to defocus and illuminate all of the input end of the cable. In that way, spatial resolution of the instrument is increased while still providing for uniform illumination of the dual detector photodiodes.

The detector includes two separate amplifying channels, one for each color band detected by the separate photodiodes. Each channel includes an electronic-chopper stabilized current amplifier, an electronic-chopper stabilized voltage amplifier, and a scaling amplifier. The first two amplifiers are preferably in the sensing head of the pyrometer which houses all of the optics. The output signals from the amplifiers are transmitted by electrical cable to the scaling amplifiers which drive an analog divider housed in a display unit which computes the ratio of the short wavelength radiation detected to the long wavelength radiation detected. The output of the divider is coupled by an RC filter and voltage follower to a display device, and optionally to a recorder.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
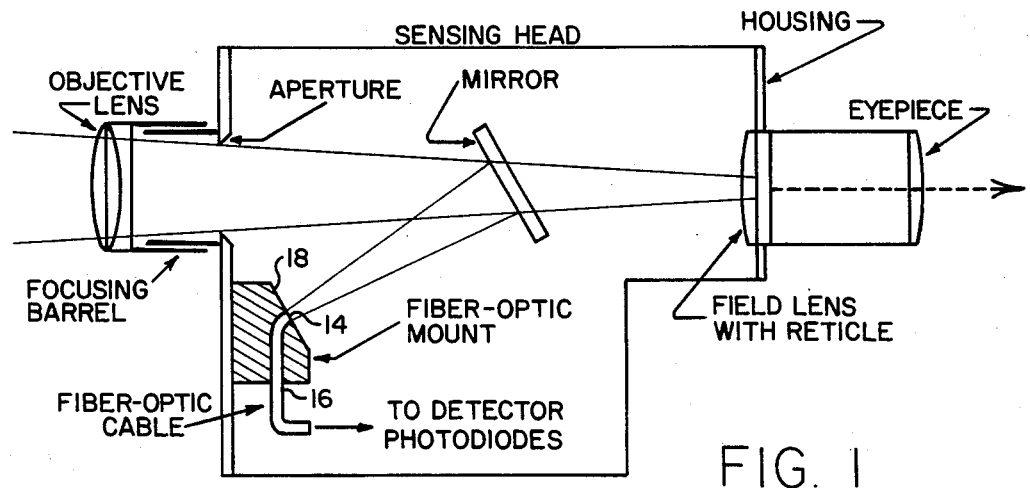
FIG. 1 illustrates a prior-art two-color band ratioing pyrometer.
Figure 2:
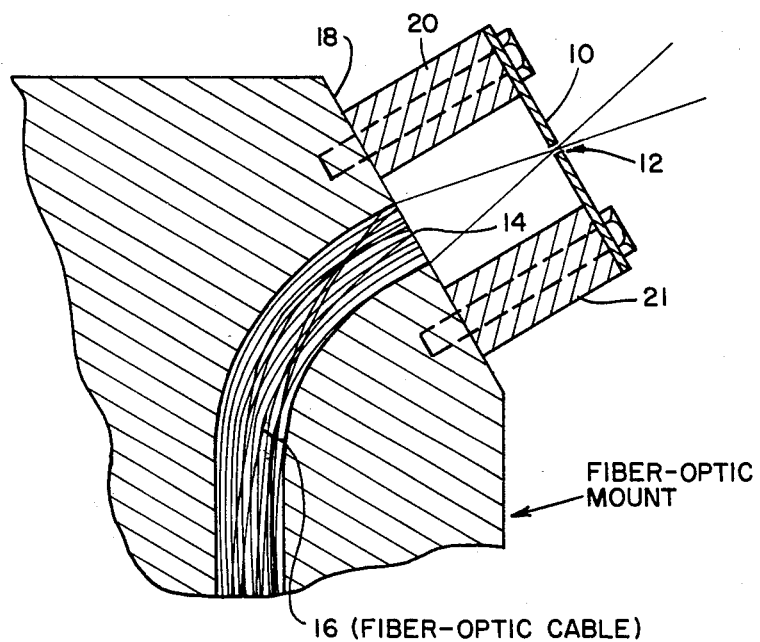
FIG. 2 illustrates an improvement in the optics of the prior-art pyrometer illustrated in FIG. 1.

Referring to FIG. 2, a modification of the fiber-optic mount of the prior-art pyrometer of FIG. 1 is shown to consist of a thin brass sheet 10 having a 0.002 inch diameter aperture 12 spaced away from the end 14 of a 0.032 inch diameter fiber-optic cable 16. That one end is polished even with the sloped face 18 of the fiber-optic mount, which is normal to the optical axis of the radiation from the target reflected by the mirror (not shown in FIG. 2). Aperture sheet mounts 20 and 21 space the 0.002 inch diameter aperture 0.1 inch above the end of the 0.032 in diameter fiber-optic cable. The image of the object focused on the field lens within the reticle, shown in FIG. 1, is focused on the plane of the aperture pinhole 12. That portion of the image passing through the aperture then falls, defocused, over much of the surface of the one end of the fiber-optic cable that is flush with the fiber-optic mount, thereby assuring more widespread illumination of the fiber-optic cable which in turn assures more complete illumination of photodiodes $D_1$ through $D_2$ shown in FIG. 2. In that manner, measurements of various high temperature elements in a complex crystal growth furnace, for example, can be made with high spatial resolution while still avoiding "hot spots" on the photodiodes.

Normally the diameter of the fiber-optic cable determines the sensing field-of-view when the image of an element is focused on the plane of the fiber-optic mount containing the flush end of the cable. By focusing the image of the element on the pinhole sheet 10, the field of view is limited to the diameter of the aperture 12, which has been laser drilled to a diameter chosen to be 0.002", and by spacing that plate away from the end of the fiber-optic cable, more widespread illumination of all fibers in the bundle is maintained while focusing on a smaller spot on the target for higher resolution.

It should be noted that the diameter of the aperture 12 is to be chosen for the resolution desired in a particular application, and that the spacing of the aperture plate from the end of the fiber-optic cable is a direct linear function of the diameter of the aperture. Consequently, it is to be understood that the dimensions 0.002" and 0.1" for a 0.032" diameter cable are given by way of example, and not limitation. The aperture may be laser drilled to virtually any size pinhole required.

In the example given, resolution is improved over the same prior-art pyrometer by restricting radiation measured from a portion of the target with a diameter that is about 1/800 of a distance to the target, as compared to a portion of the target with a diameter that is about 1/100 of that distance using the prior-art pyrometer optics. As a consequence, the radiation density for the same diameter of fiber-optic cable is decreased proportionally. That requires improved sensitivity in the detector circuit, which will now be described.

Figure 3:
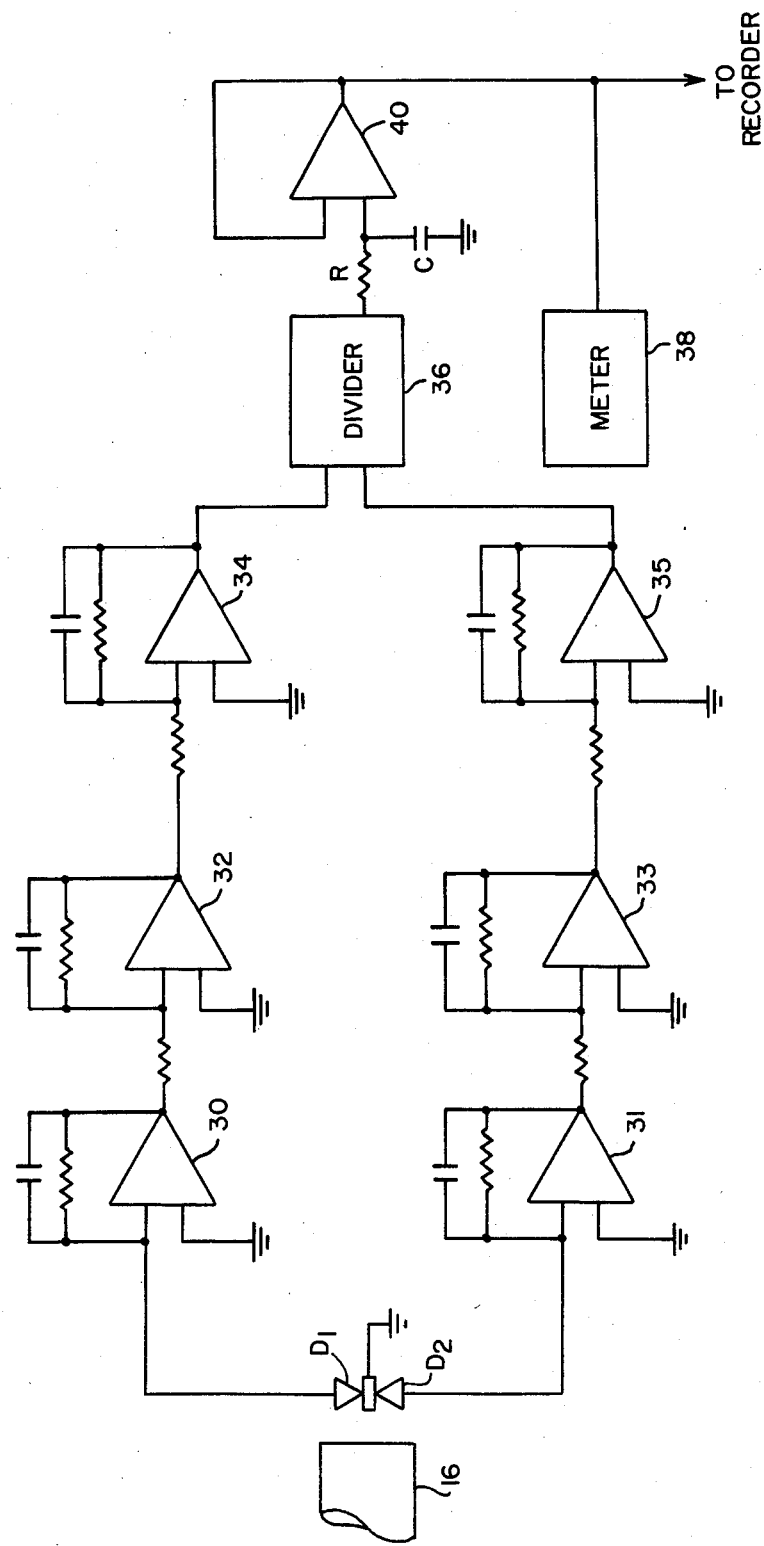
FIG. 3 is a circuit diagram of a detector for an optical pyrometer improved in the manner illustrated in FIG. 2.

Referring to FIG. 3, the photodiodes $D_1$ and $D_2$ positioned proximate the exit end of the fiber-optic cable are designed for short and long wavelength sensitivity. In practice, the two photodiodes employed in the prior-art pyrometer are fabricated in a semiconductor (silicon) with three layers doped P, N and P, in that sequence. The top (P) layer absorbs the short wavelength light. The longer wavelength passes through the center (N) layer connected to circuit ground and is absorbed by the bottom (P) layer. The two (P) layers function as anodes and the center (N) layer functions as a cathode. Consequently, the photodiodes are shown schematically in FIG. 3 as two back to back photodiodes $D_1$ and $D_2$.

Separate but identical channels are provided for amplifying the currents generated by the photodiodes. Referring to the short-wavelength channel, a high gain, high stability electronic chopper-stabilized current amplifier 30 converts the current signal into a voltage signal, and a voltage amplifier 32 amplifies the voltage signal sufficiently to enable it to be transmitted over a shielded connecting electrical cable to a ratioing display unit. The amplifiers 31 and 33 in the long wavelength channel function in the same way.

Scaling amplifiers, 34 and 35 scale the voltage signal in each channel to a range that is appropriate for the operation of a ratioing circuit 36, which divides the short wavelength signal by the long wavelength signal. Such a ratioing circuit may be an analog integrated circuit (IC) divider 4214BP working with voltage signals from 308AN scaling amplifiers, which receive voltage signals from 760IJD chopper stabilized amplifiers. The current amplifiers may also be 760IJD chopper stabilized amplifiers. However, it should be recognized that the ratioing signal may be obtained by any linear divider and could even be implemented using digital techniques, such as with a programmed microprocessor or a specially designed digital IC chip.

The output of the analog ratioing circuit 36 is filtered by an RC circuit having a time constant sufficient to stabilize the output for display using a digital voltmeter 38. A voltage follower 40, comprised of a 101AH integrated circuit, couples the output of the ratioing circuit to the digital voltmeter and to an output terminal for use with an external display or recording device.

What is claimed is:

1. In the sensing head of a two-color band ratioing pyrometer using a fiber optic cable to couple radiation to dual detector photodiodes, where the radiation from a target is split by a beam splitter into two beams, one beam to a field lens with a reticle and an eyepiece for aiming the beam onto a target and an objective lens for focusing the image of the target at said field lens, and one beam reflected by said beam splitter to said fiber optic cable coupling radiation onto said dual detector photodiodes adapted for detection of two different color bands, an improvement comprising an opaque sheet having a pinhole positioned in the focal plane of said one beam reflected by said beam splitter to said fiber optic cable, said opaque sheet being spaced in front of the input end of said fiber optic cable, and a positioning of said opaque sheet with the axis of said pinhole aligned approximately with the axis of said fiber optic cable, said spacing of said opaque sheet in front of said cable being sufficient to pass a small portion of the radiation reflected to said opaque sheet and focused onto said pinhole, and to allow the focused beam passing through said pinhole to defocus over a substantial part of the end of said fiber optic cable.

2. A two-color band ratioing pyrometer as defined in claim 1 where the focused beam in said pinhole is allowed to defocus over a substantial part of the end of said fiber optic cable, the combination comprising two separate amplifying channels, one for each color band detected by dual detection photodiodes, comprising for each channel an electronic-chopper stabilized current amplifier, an electronic-chopper stabilized voltage amplifier, and a scaling amplifier in cascade, and a single divider connected to the outputs of the two channels for producing a band ratioed signal.

3. A two-color band ratioing pyrometer as defined in claim 2 where the output of said divider is filtered by an RC circuit having a time constant sufficient to stabilize the output for display, and using a digital voltmeter for display.

4. A two-color band ratioing pyrometer as defined in claim 3 comprising a voltage follower for producing an output signal for display or recording.

5. In a radiation pyrometer having means for focusing a target onto the end of a fiber optic cable which couples radiation onto photo-detection means, apparatus for improving spatial resolution comprising means for focusing said target onto a focal plane, an opaque sheet having an aperture placed in said focal plane, and a spacing between said one end of said fiber optic cable and said opaque sheet sufficient for the portion of said target focused onto said focal plane that passes through said aperture in said opaque sheet to defocus and illuminate substantially all of said one end of said fiber optic cable thereby providing a means for limiting the field of view of said pyrometer for increased spatial resolution without limiting the area of said photodetection means receiving radiation through said optical cable.

* * * * *